US006932418B1

(12) United States Patent
Connell

(10) Patent No.: US 6,932,418 B1
(45) Date of Patent: Aug. 23, 2005

(54) TRUCK TENT

(76) Inventor: Mark Connell, 16037 S. 85th. Pl., Tinley Park, IL (US) 60477

( * ) Notice: Subject to any disclaimer, the term of this patent is extended or adjusted under 35 U.S.C. 154(b) by 0 days.

(21) Appl. No.: 10/838,003

(22) Filed: May 4, 2004

Related U.S. Application Data

(60) Provisional application No. 60/473,976, filed on May 30, 2003.

(51) Int. Cl.[7] .................................................. B60P 3/34
(52) U.S. Cl. ...................... 296/161; 296/174; 296/159
(58) Field of Search ............................. 296/156, 161, 296/174, 37.6, 159

(56) References Cited

U.S. PATENT DOCUMENTS

| | | | | |
|---|---|---|---|---|
| 1,276,388 A | * | 8/1918 | Marx | 296/161 |
| 1,300,021 A | * | 4/1919 | Richards | 296/161 |
| 1,477,111 A | * | 12/1923 | Eaton | 296/174 |
| 3,367,347 A | | 2/1968 | Smith | |
| 3,466,082 A | * | 9/1969 | Branch | 296/164 |
| 4,027,911 A | * | 6/1977 | Johnson | 296/161 |
| 4,294,484 A | * | 10/1981 | Robertson | 296/156 |
| 4,652,040 A | * | 3/1987 | Mahan | 296/159 |
| 4,695,087 A | | 9/1987 | Hollrock | |
| 5,080,426 A | * | 1/1992 | Johnson | 296/161 |
| 5,339,851 A | | 8/1994 | Miller | |
| 5,462,330 A | | 10/1995 | Brown | |
| 5,961,176 A | * | 10/1999 | Tilly | 296/165 |
| D428,595 S | * | 7/2000 | Salinas | D12/404 |
| 6,254,169 B1 | | 7/2001 | Arthur | |
| 6,283,536 B1 | * | 9/2001 | Muzyka et al. | 296/165 |
| 6,428,079 B1 | | 8/2002 | Van Dyke | |
| 6,679,542 B1 | * | 1/2004 | Semotuk | 296/174 |
| 6,749,252 B2 | * | 6/2004 | Cervenka | 296/165 |
| 2002/0163221 A1 | * | 11/2002 | Smith | 296/164 |
| 2004/0212218 A1 | * | 10/2004 | Stabile | 296/159 |

* cited by examiner

Primary Examiner—Jason Morrow
(74) Attorney, Agent, or Firm—Stanton Collier

(57) ABSTRACT

The truck tent has a base assembly that is removably secured atop the pickup truck bed side walls. This base assembly includes an extended living area having a pair of extended bed frames that project outwardly from the truck bed side walls and are attached to the top of the side walls. At least two frame supports are used for maintaining the extended bed frames in a substantially parallel position relative to the ground. The upper ends of the frame supports are connected into the outer edges of the extended bed frame and the lower end of the frame supports are positioned against the rear tire and the ground. A tent assembly is easily, quickly and removably connected to the extended bed frames of the base assembly and to the truck bed.

20 Claims, 8 Drawing Sheets

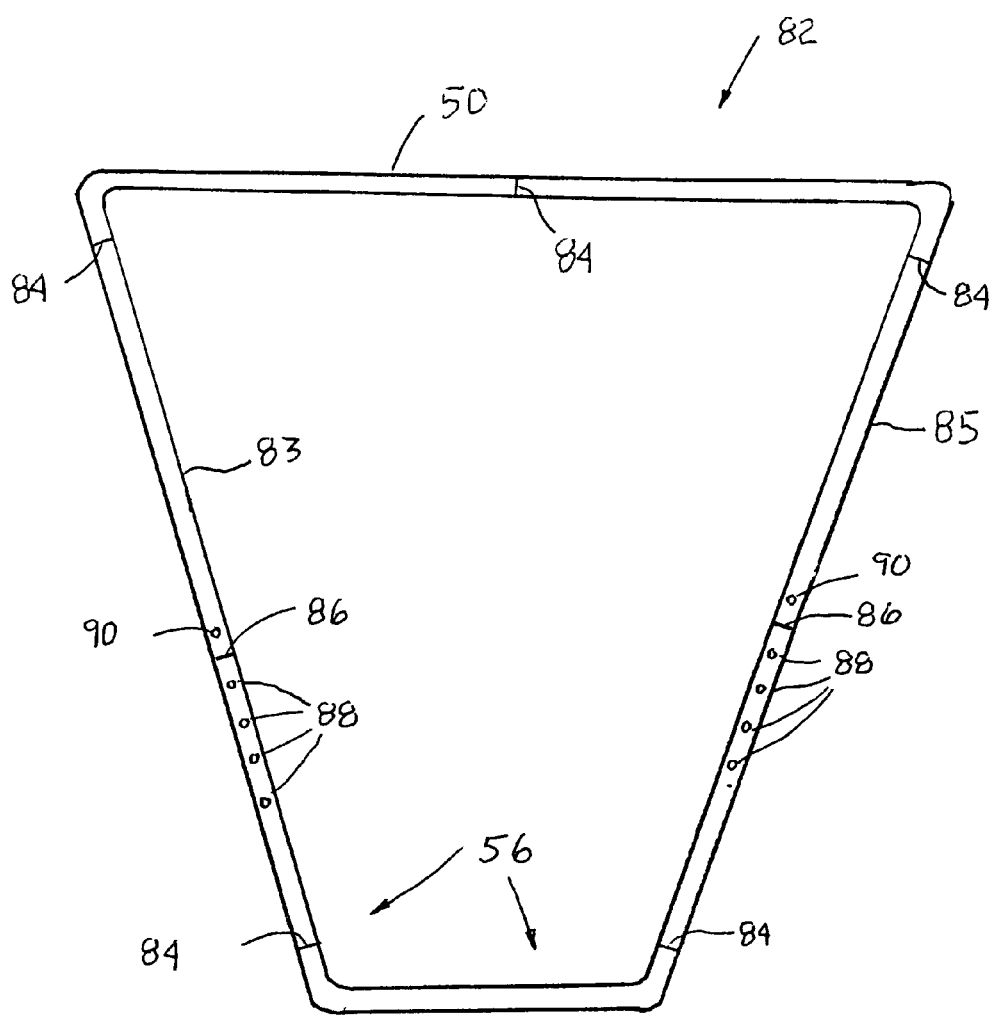

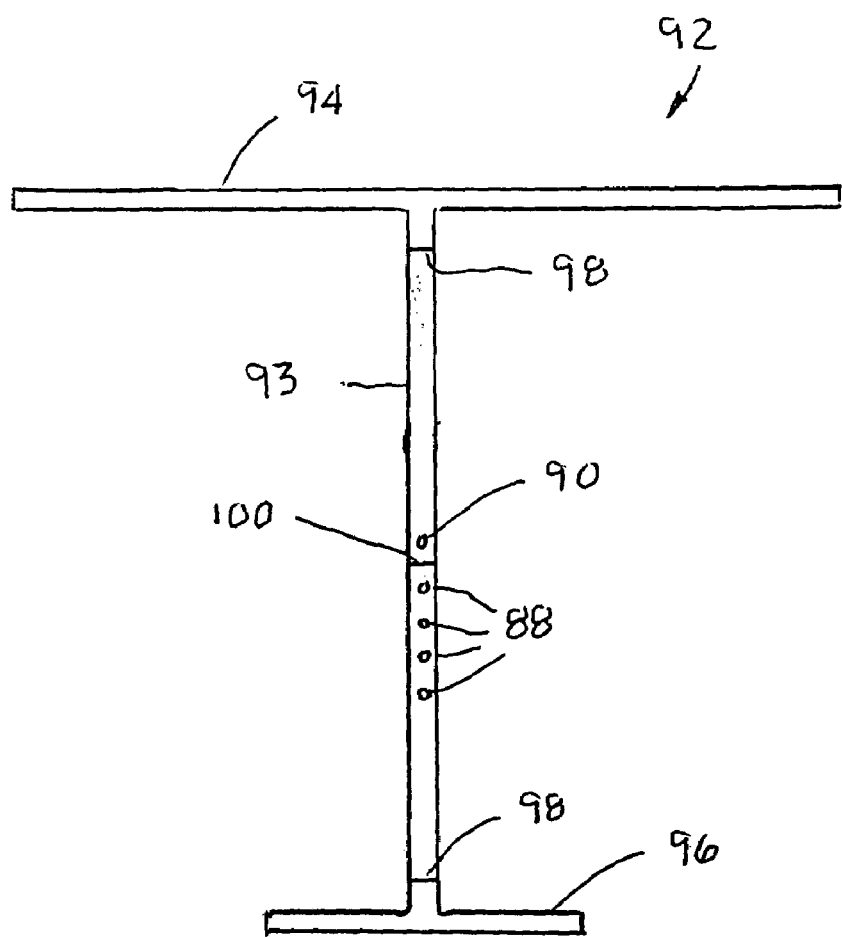

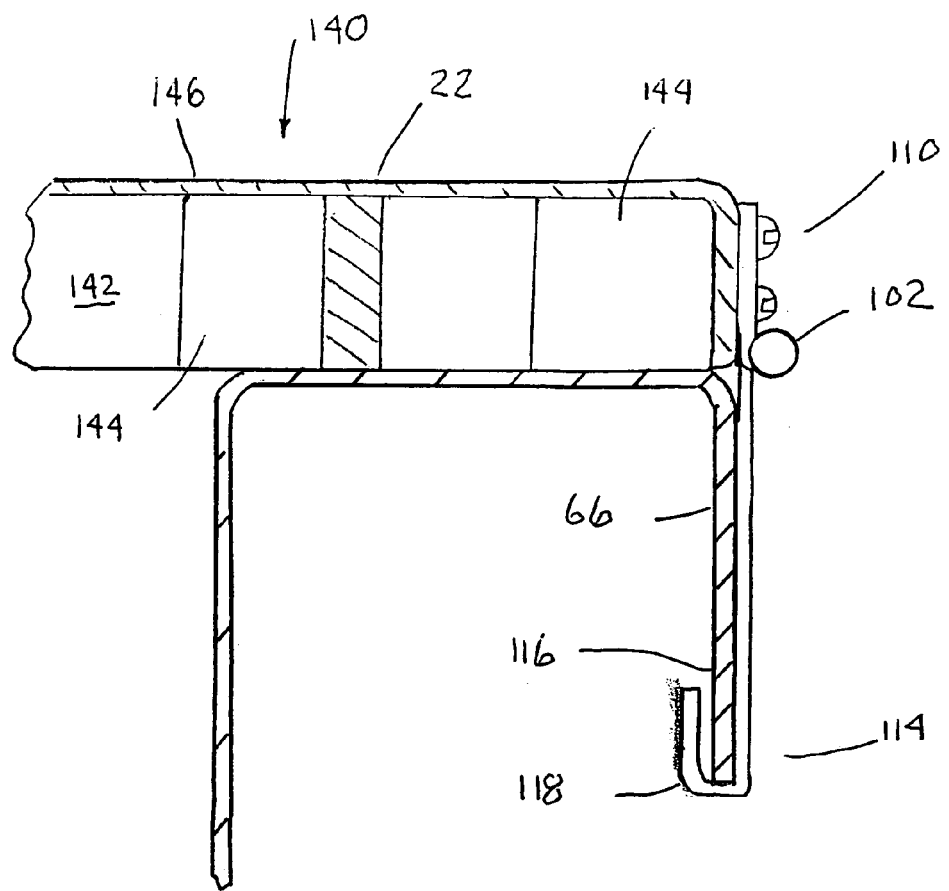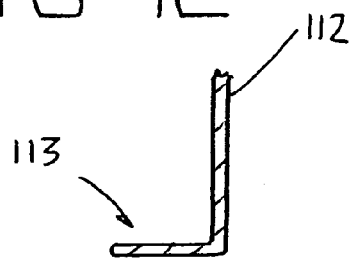

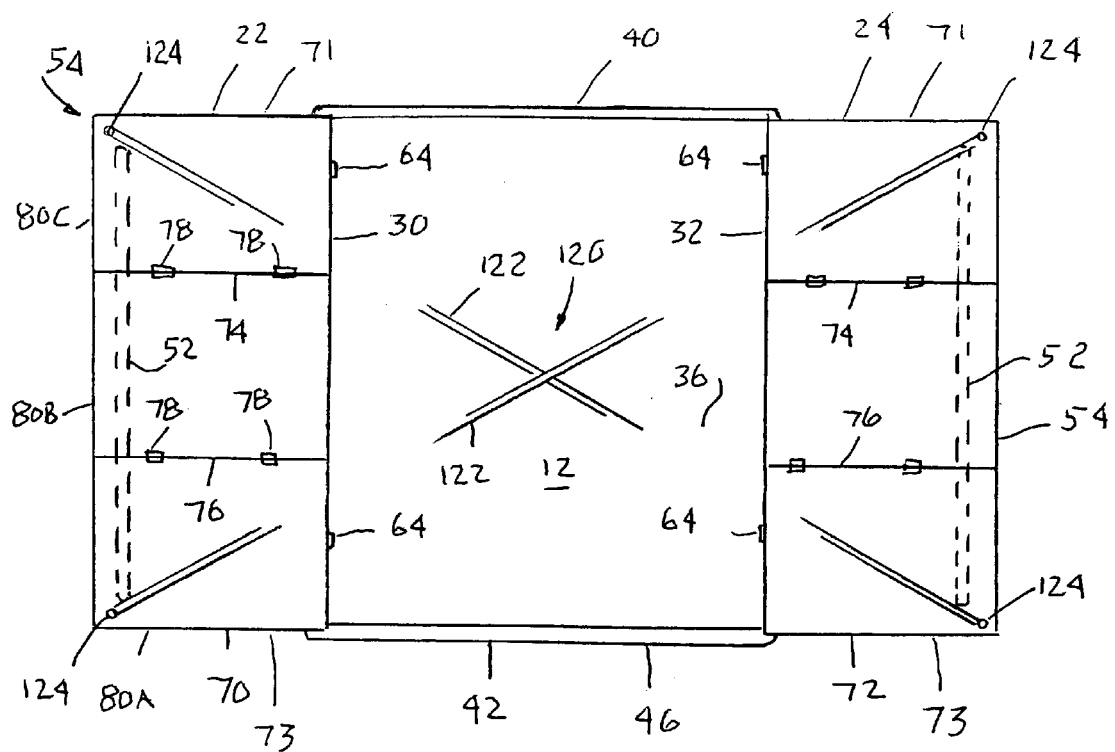

TRUCK TENT

CROSS-REFERENCE TO RELATED APPLICATIONS

This patent application incorporates by reference provisional patent application 60/473,976, dated May 30, 2003, titled "Truck Tent," and is the regular patent application of this provisional patent application.

BACKGROUND OF THE INVENTION

1. Field of the Invention

The present invention relates to pickup trucks, and, in particular, to tent-like structures that attach to vehicles like pickup trucks, and, in greater particularity, relates to tent-like structures that are attached to the truck beds of such.

2. Description of the Related Art

Pickup trucks constitute a substantial portion of the vehicles on the road. The pickup bed provides an area having multiple uses, mostly for moving large items. As far as becoming a living area, a cap provides protection from the weather and from unwanted intruders to a certain degree. Normally, there is no standing room under a cap installed on the truck bed and it is difficult to remove the cap to fully use the truck bed. A permanent camper allows for standing in the truck bed but prevents other uses.

U.S. Pat. No. 3,367,347 discloses a pickup bed cover which can be converted into a camping tent only covering the truck bed. The user must install a frame having poles that fit into recesses on the top edge of the truck bed. Because of the unique shapes of truck beds, multiple designs are required.

U.S. Pat. No. 4,695,087 discloses a truck bed frame having swinging panels for a bed cover. The frame allows for carrying outsize cargo.

U.S. Pat. No. 5,339,851 discloses a canopy tent for use in a pickup truck bed. Several belts attached to the bed hold the canopy tent thereto and provide devices for holding the pole assemblies. No additional living area is shown other than the bed area.

U.S. Pat. No. 5,462,330 discloses a camper/cargo trailer having a tent structure mounted on the trailer. Additional living space is provided by boards 26 and 28. The tent structure is not easily removable to allow for cargo use of the trailer.

U.S. Pat. No. 6,254,169 discloses a bed cover having two sections that are rotated from the truck bed side walls.

U.S. Pat. No. 6,428,079 discloses a foldable cap for a pickup truck bed.

Other means to increase the living area when a pickup truck is used includes a pop-up camper and a bed mounted camper. These options are clearly more expensive and require greater effort in their use.

Thus, there exists a need for an assembly that allows for increased living space on a conventional pickup truck.

BRIEF SUMMARY OF THE INVENTION

The present invention of a truck tent provides for increased living space when installed onto a bed of a conventional pickup truck.

The truck tent of the present invention comprises a base assembly that is removably secured atop the pickup truck bed side walls. This base assembly includes an extended living area which comprises a pair of extended bed frames that project outwardly from the truck bed side walls and are removably attached to the top of the side walls. At least two frame supports are used for maintaining the extended bed frames in a substantially parallel position relative to the ground. A tent assembly is easily, quickly and removably connected to the extended bed frames of the base assembly and to the truck bed.

In one embodiment of the present invention, the truck tent provides for almost double the living area where the extended living area may be used as a sleeping area, storage area, and/or seating area. The extended living area is not only outside of the truck bed but provides a higher ceiling for standing within the truck bed. The bed frames when used as a sleeping area allow for sleeping quarters up to four people or more in the truck tent. The extended living area further provides for a working level above the truck bed floor. The extended living area has the extended bed frames supported on the truck bed side walls and by frame supports that rest upon the ground and against the rear tires.

In this embodiment, the base assembly of the truck tent is adjustable to accommodate different truck bed heights, widths and lengths for greater stability.

Because a tent is mounted to the extended bed frames of the extended living area, there is an increased height of the tent due to the deeper base area and thus standing is possible. The tent of the present invention may use an expanded tent bottom because the recessed truck bed.

The truck tent of the present invention provides for ease of use since the tent is folded up after a tent frame of two support rods is removed and disconnected, and the extended bed frames of the extended living area are also folded for storage. This allows for quick assembly and disassembly.

The present invention further provides for an increased benefit of having a pickup truck, in that a camper is not required, i.e., pop-up camper or a bed mounted camper.

These and many other objects, features and advantages of the present invention will be readily apparent to one skilled in the pertinent art from the following detailed description of a preferred embodiment of the invention and the related drawings.

BRIEF DESCRIPTION OF THE SEVERAL VIEWS OF THE DRAWINGS

FIG. 3A is an elevation view of one frame support.

FIG. 3B is an elevation view of another frame support.

FIG. 4B is a partial cross section through the top edge of the truck side wall illustrating another means for mounting of the extended bed frame to the truck bed.

FIG. 4C is a partial cross section view of a lower L-shaped end of the bracket for connecting the bed frame to the top of the side wall.

FIG. 5 is a top view of the extended tri-fold bed frames as mounted on the bed of a pickup truck.

DETAILED DESCRIPTION OF THE INVENTION

Figure 1:
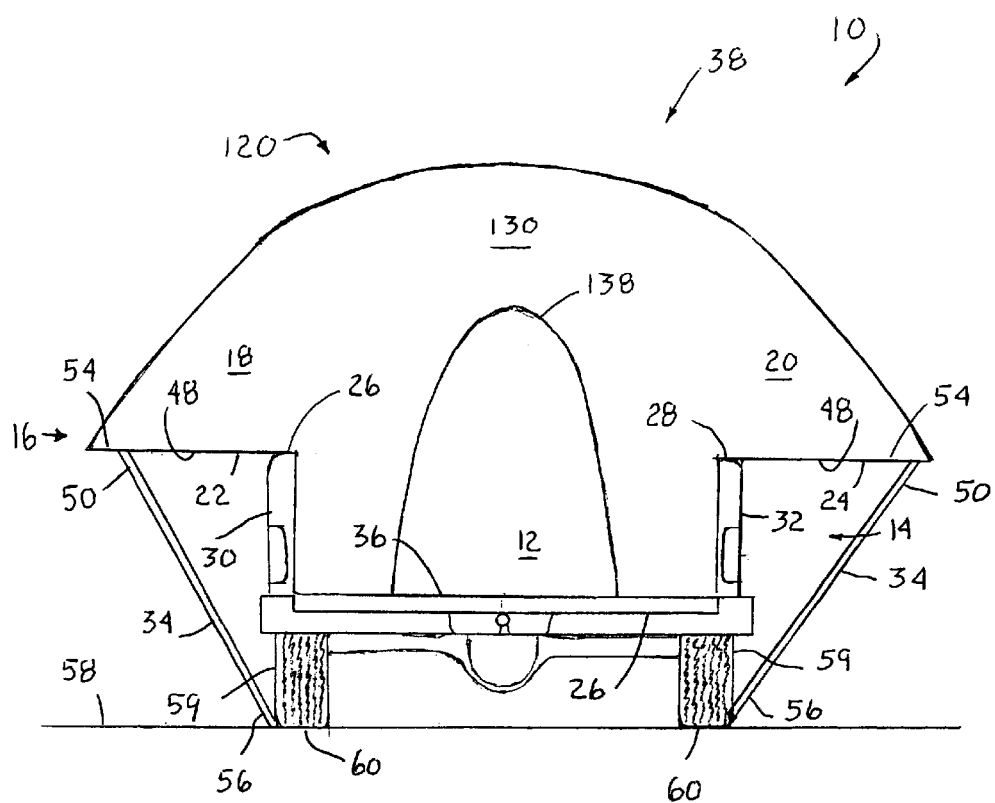
FIG. 1 is a rear elevation view of the truck tent of the present invention as installed on a pickup truck.

FIG. 1 illustrates by a rear elevation view a truck tent 10 of the present invention mounted on a truck bed 12 of a typical pickup truck 14.

Figure 2:
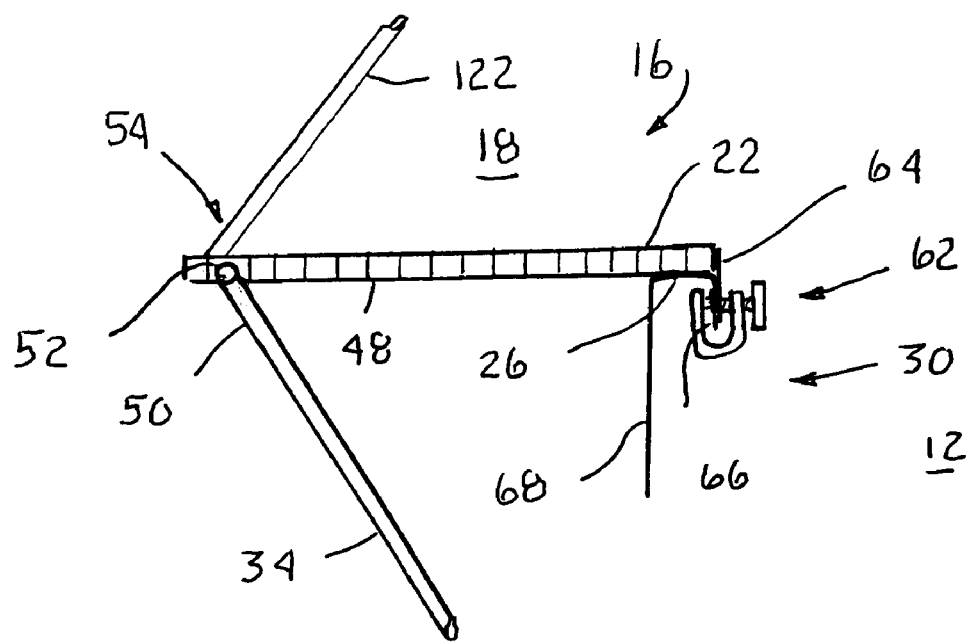
FIG. 2 is a partial rear elevation cross sectional view of an extended bed frame, a frame support, and a means of securing the extended bed frame to the truck bed.

The truck tent 10, FIG. 1, of the present invention comprises a base assembly 16, shown partially in FIG. 2, that is removably secured on the truck bed 12, extended living areas 18 and 20 comprising a pair of extended bed frames 22 and 24 that project outwardly from the truck bed 12 and are removably attached to top edges 26 and 28 of a driver side wall 30 and a passenger side wall 32, respectively. Two frame supports 34, one per side, maintain the extended bed frames 22 and 24 in a substantially parallel position relative to a bed floor 36 of the truck bed 12. A tent assembly 38 is removably connected to the extended frames 22 and 24 of the base assembly 16 and to the truck bed 12.

The present invention is suitable for variations in styles of truck beds such as step-side walls and fleet-side walls as well as variations in width, length and depth of the truck bed.

Referring to FIG. 5, the truck bed 12 has the bed floor 36, a cab wall 40, the driver side wall 30, the passenger side wall 32, and a gate wall 42 being the gate 44, shown in a lowered condition in FIG. 1. As presently disclosed, the top edges 26 and 28, FIG. 1, of the side walls 30 and 32, respectively, should be substantially flat, unless specifically mentioned herein, for mounting of the truck tent 10. A piece of rubber 46, FIG. 4A, foam, or the like may be placed between the extended bed frames 22 and 24 and the top edges 26 and 28 of the truck bed 12 to insure proper support, prevent damage to the top edges, and prevent the entrance of insects or moisture. Although one side of the extended bed frame rests on the top edge of the side wall, the other side of the bed frame must be fully supported to withstand substantial loads in a range from several pounds to hundreds of pounds to a possible maximum of about 500 pounds.

In this regard, the frame supports 34 connect into a bottom 48, the underneath side of the extended bed frames 22 and 24. The frame supports 34 at the upper ends 50 removably connect into recessed channels 52, FIGS. 2 and 5, that are located on the bottoms 48 of the frames 22 and 24 and in close proximity to the outer edges 54 of the extended bed frames 22 and 24. The lower ends 56 of the frame supports 34 are positioned on the ground 58 and against the outside walls 59 of the rear tires 60. The lower ends 56 of the support frames 34 may be staked into the ground 58 to further secure the support frames 34. Due to adjustments in the support frames 34, the outer edges 54 of the extended bed frames 22 and 24 will have a tendency to rotate about the respective support side walls and into the rear tires, especially under load. Therefore, the resulting forces from the support frame 34 will insure that the means of attaching of the extended bed frames 22 and 24 to the top edges 26 and 28 of the truck bed 12 will remain firmly in position as will be further disclosed below.

FIG. 2 discloses a c-clamp 62 holding a bracket 64 against a lip 66 of the top edge 26. As seen therein, an outer panel 68 of the driver side wall 30, the top edge 26, and the lip 66 form an upside down J. Although the bracket 64 of the present invention provides for proper connection of the extended bed frames 22 and 24 to the top edges 26 and 28, other styles of securing means are clearly feasible to obtain the purpose disclosed.

The extended frames 22 and 24 may have several embodiments, but the preferred embodiment of the extended bed frames 22 and 24, FIG. 5 by top view, illustrates two extended tri-fold bed frames 70 and 72 having hinges 74 and 76, 2 per frame, running laterally, parallel to the width of the truck bed 12. Another embodiment of the hinges may use door-like hinges 78 rather than the longer type of hinges. The three sections 80A, 80B, and 80C may be folded together for compact storage.

The extended bed frames 22 and 24 may be made of plywood, hardboard, etc. A frame may also be like a hollow core, foam filled door. A plastic extended bed frame 140 may be constructed of hollow cells 142 with interior walls 144 as seen in FIG. 4B. The top surface 146 would be smooth plastic and the bottom surface would have the cells exposed to reduce weight. The recessed channels 52 would be on the underneath side of the bottom 48 of the extended frames 22 and 24, approximately 1 to 2 inches deep. These frames may have a painted finish and should have sufficient strength to support several hundred pounds.

The extended bed frames 22 and 24 must have external support frames 34 to maintain their position parallel to the truck bed floor 36. One embodiment of a frame support 82 is shown in FIG. 3A. The frame support 82 has an upper end 50 being approximately 5 feet long and a lower end 56 being approximately 2 feet long and is shaped overall like a trapezoid with sides 83 and 85. The frame support 82 is made of tubular metal such as aluminum, steel, etc. A plurality of assembly joints 84 allow the support 82 to be assembled and/or disassembled for use or storage. Each joint 84 comprises a reduced outer diameter tube which can be closely inserted into an adjoining tube for a given distance sufficient to provide a secure joint. An adjustable joint 86 in each side 83 and 85 comprise one tube end being of reduced outer diameter and of a length of approximately several feet. This reduced diameter tube would closely fit within the adjoining tube. Through holes 88 in the reduced diameter tube would allow a locking pin to be inserted therein when the proper adjustment is obtained. A single through-hole 90 is located in the outer tube. The pin being inserted into the through-hole 90 and one of the through-holes 88. Each side 83 and 85 may be adjusted to a different length to allow for uneven ground 58.

A second embodiment of a frame support 92 is shown in FIG. 3B. This frame support 92 is shaped like a T with a foot. The upper end 94 is approximately 5 feet long and the lower end 96 is approximately 2 feet long. Two assembly joints 98 allow the support 92 to be dissembled or assembly. An adjustable joint 100 is located in a center leg 93, similar to the adjustable joint above, allows for a limited adjustment in the vertical length of the support 92 but is more suitable for a level ground 58 surface.

Figure 4A:
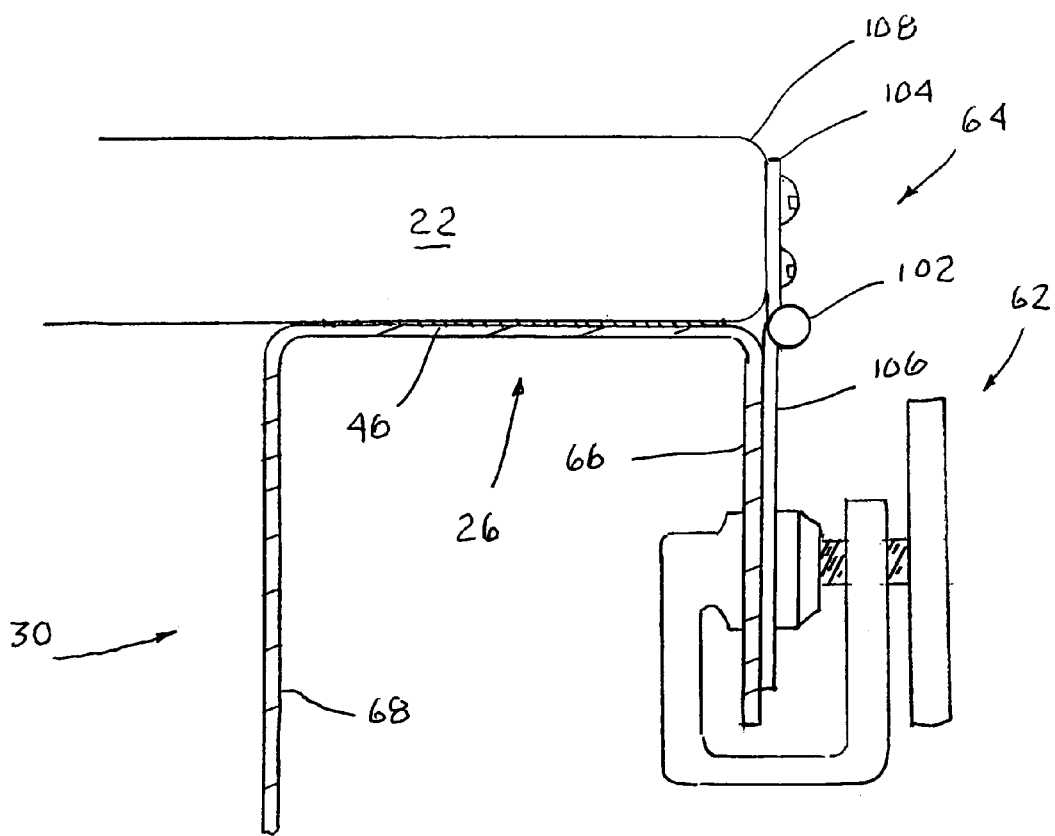
FIG. 4A is a partial cross section through the top edge of the truck side wall illustrating the mounting of the extended bed frame to the truck bed.

FIG. 4A illustrates by a cross sectional view one embodiment of removably connecting the extended bed frame 22 to the truck side wall 30. As seen therein, the bracket 64 has a hinge 102 positioned between an upper hinge plate 104 and a lower hinge plate 106. The upper hinge plate 104 may be attached to the bed frame 22 edge 108 by bolting or similar securing means. The lower hinge plate 106 rests against the lip 66 that extends down from the top edge 26 of the side wall 30. The lip 66 may be several inches wide in depth or so according to the make of the truck. The c-clamp 62 is positioned about the lip 66 and the lower hinge plate 106 and tightened.

A second embodiment of the bracket 110 is shown in FIG. 4B where the lower hinge plate 114 has a J-shaped end 118 which fits about the lower lip 116 of the lip 66. The J-shaped end 118 is positioned over the lower lip 116 during installation of the bed frame 22. The bed frame 22 is raised and rotated counter clockwise about the hinge 102 so that the end 118 may be hooked over the lower lip 116.

Another embodiment of a bracket 112 is shown in FIG. 4C where the lower end 113 is L-shaped and is easily hooked over the lower lip 66. In any of the above embodiments, the c-clamp 62 may be used to further secure the bed frame 22 to the top edge 26 of the side wall.

Attached to the base assembly 16 is the tent assembly 38, FIG. 1, having a tent frame 120 connected to the extended bed frames 22 and 24 such as shown in FIG. 5. The tent frame 120 may comprise 2 nylon shock corded fiberglass tent supports 122, only one shown in FIG. 2, that are secured to the outside corners of the extended bed frames 22 and 24 into support cups 124, four shown in FIG. 5. The support cups 124 may be hard plastic cups installed into holes drilled into the top surfaces 146 of the extended bed frames 22 and 24, FIG. 4B, for example. The tent supports 122 are mounted so as to form an X with the crossing point secured together by straps or VELCRO, for example. The tent supports 122 may be further broken down for storage in that they will have a length of approximately 10 to 15 feet depending on the size of the truck bed.

Figure 6:
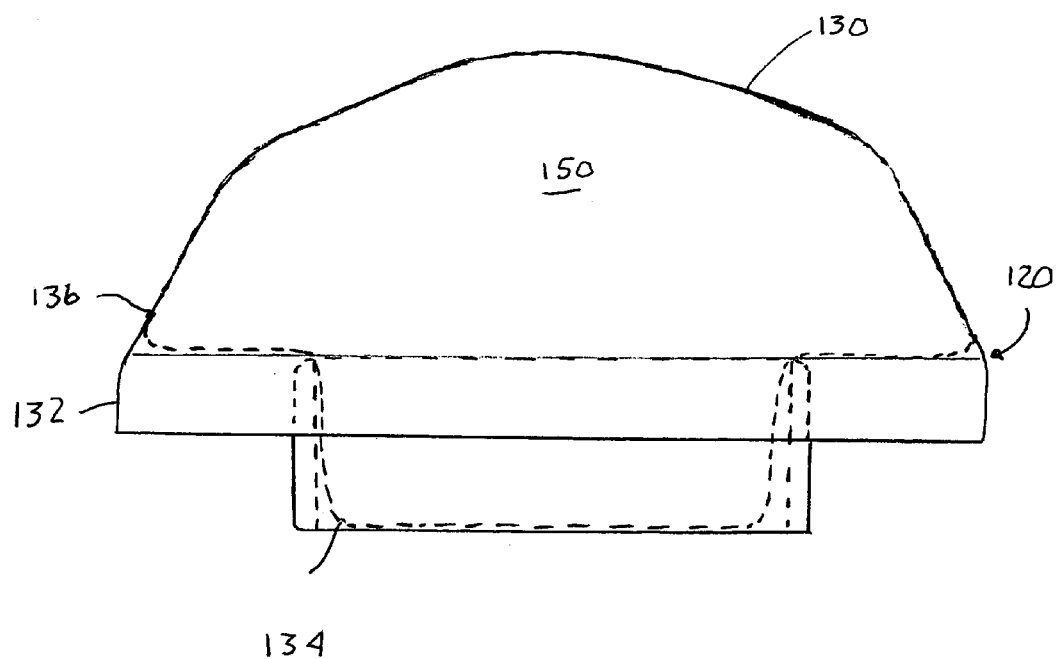
FIG. 6 is a partial rear elevation view from the cab side as shown in FIG. 1 showing the canopy tent upon the pickup truck bed.

A canopy-like tent 130, FIG. 1 and FIG. 6, is installed on the tent frame 120. The tent 150 is a tent that would have dimensions of approximately 7 feet by 12 feet. The extended frames occupying approximately 6 feet of the width. The truck bed 12 ranges from about 4.7 to 6.2 feet in width.

Although a canopy-like tent is shown, other styles of tents are possible with modifications to the tent supports and the tent itself.

As seen in FIG. 6, an outside peplum 132 is attached near the base line 136 of the tent 130. An extended tent bottom 134 drapes into the truck bed for approximately 30 inches on 2 sides over the extended frames and one side drapes into the truck bed at the cab wall. The outside peplum 132 hangs like a skirt around and over the extended bed frames 22 and 24 and the cab wall 40 to provide for water runoff. This includes both front and rear sides 71 and 73 of the extended bed frames 22 and 24. There is no requirement for a peplum over the tailgate area. The inside of the tent is secured to the tent supports 122 by VELCRO ties or wraps, approximately 4 to 8 per tent support.

It is further possible to have multiple ties attached to the tent fabric about the base of the tent so that excess material is folded or otherwise secured when the ties are secured to the base assembly, the extended frames, frame supports, or the truck. These ties will further aid in securing the tent assembly to the truck in severe weather.

The tent 130 would have an approximate base area of 7×12 feet, and has the outside peplum 132, FIG. 6, that hangs about 12 inches over the extended frames and the cab wall 40. A zippered D style door 138, FIG. 1, having a width of about 30 inches and a height of about 60 inches may installed in the tail gate section to allow entry and exit of the tent 130.

Further, an additional tent support may be included across the tail gate area to increase the interior room as well as making entering and leaving the door easier. Additional shock corded rods may be placed on the outer edges of the extended bed frame between the two outer corners so that the tent fabric in the bed area is lifted up and out.

In operation, a user would first install the frame supports 34 to the extended bed frames 22 and 24 on the truck bed and then secure the extended bed frames 22 and 24 to the side walls of the truck bed with the c-clamps 62. The frame supports 34 may initially be vertically oriented while the frames 22 and 24 are secured. The loose tent would be placed in the truck bed and the user would stand inside of the tent and install the crossing shock corded rods. Appropriate ties would be used to secure the tent to the tent frame, the truck bed and to the extended bed frames 22 and 24.

Clearly, many modifications and variations of the present invention are possible in light of the above teachings and it is therefore understood that within the inventive scope of the inventive concept that the invention may be practiced otherwise than specifically claimed.

What is claimed is:

1. A truck tent for use on a pickup truck, the truck tent comprising:

a base assembly, the base assembly being removably secured to a truck bed of the pickup truck, the base assembly comprising an extended living area, the extended living area comprising a pair of extended bed frames being removably mounted to the truck bed, the extended bed frames being supported on the truck bed and removably secured thereon by a plurality of frame supports wherein the extended bed frames provide an area for additional sleeping or storage or other uses, the extended bed frames being externally supported by frame supports; and a tent assembly, the tent assembly being removably secured to the base assembly and to the truck bed, the tent assembly comprising a tent frame and a tent, the tent including a peplum thereabout and an extended tent bottom.

2. A truck tent as defined in claim 1 wherein the truck bed has two side walls having interior lips upon which the extended bed frames are removably mounted.

3. A truck tent as defined in claim 2 wherein the extended bed frames are removably mounted to the truck bed by means of brackets.

4. A truck tent as defined in claim 3 wherein the brackets are hinged.

5. A truck tent as defined in claim 3 wherein the brackets are removably mounted to the truck bed by means of clamps.

6. A truck tent as define in claim 3 wherein the brackets are removably mounted to the truck bed by means of a L or J-shaped lower end.

7. A truck tent as defined in claim 1 wherein the extended living area comprises the pair of extended frames, each of the extended bed frames being foldable.

8. A truck tent as defined in claim 7 wherein the extended bed frames comprises either 2 or 3 folding pieces.

9. A truck tent as defined in claim 8 wherein the extended bed frames have an upper surface being flat.

10. A truck tent as defined in claim 8 wherein the extended bed frames comprise a plastic material.

11. A truck tent as defined in claim 10 wherein the extended bed frames have an interior structure being of an open cell pattern to maximize strength and minimize weight.

12. A truck tent as defined in claim 7 wherein the frame supports are removably mounted to an underside of each extended bed frames.

13. A truck tent as defined in claim 9 wherein the bed frame has a longitudinal channel proximate to the outer edge of the bed frame.

14. A truck tent as defined in claim 13 wherein the frame supports are removably secured on the ground at a lower end and removably secured on the upper end to the channel, the lower end of the frame support resting against a rear tire of the truck and the ground thereat.

15. A truck tent as defined in claim 1 wherein the frame support is adjustable in length between the lower end and the upper end.

16. A truck tent as defined in claim 15 where the frame support is shaped like a trapezoid.

17. A truck tent as defined in claim 14 wherein the tent is mounted over a pair of crossed tent supports that are removably mounted proximate to the outer edges of the extended bed frames.

18. A truck tent as defined in claim 1 wherein adults may stand upright therein under the tent and have unique seating upon the extended bed frames.

19. A truck tent for use on a pickup truck, the truck tent comprising:
 a base assembly, the base assembly being removably secured to a truck bed of the pickup truck, the base assembly comprising an extended living area, the extended living area comprising a pair of extended bed frames being removably mounted to the truck bed, the extended bed frames being supported on the truck bed and removably secured thereon by a plurality of frame supports wherein the extended bed frames provide an area for additional sleeping or storage or other uses, the extended bed frames being externally supported by frame supports; and
 a tent assembly, the tent assembly being removably secured to the base assembly and to the truck bed, the tent assembly comprising a tent frame and a tent, the tent including a peplum thereabout and an extended tent bottom, wherein the extended tent bottom is able to accommodate different sizes of truck beds.

20. A truck tent for use on a pickup truck, the truck tent comprising:
 a base assembly, the base assembly being removably secured to a truck bed of the pickup truck, the base assembly comprising an extended living area, the extended living area comprising a pair of extended, foldable bed frames being removably mounted to the truck bed, the extended bed frames having a longitudinal channel proximate to the outer edge of the bed frame, the extended bed frames having an upper flat surface, the extended bed frames being supported on the truck bed and removably secured thereon by a plurality of frame supports, the extended bed frames providing an area for additional sleeping or storage or other uses, the extended bed frames being externally supported by frame supports, the frame supports are removably secured on the ground at a lower end and removably secured on the upper end to the channel, the lower end of the frame support resting against a rear tire of the truck and the ground thereat; and
 a tent assembly, the tent assembly being removably secured to the base assembly and to the truck bed, the tent assembly comprising a tent frame and a tent, the tent including a peplum thereabout and an extended tent bottom, further the tent includes the peplum attached to the sides and the back of the tent so as to prevent water from entering the truck bed, the peplum hanging over a cab wall and the extended bed frames including the front and rear sides thereof.

\* \* \* \* \*